United States Patent [19]

Mietzsch et al.

[11] 4,005,037

[45] Jan. 25, 1977

[54] POLYCARBONATE-POLYVINYL CHLORIDE MOULDING COMPOUNDS

[75] Inventors: Fritz Mietzsch; Dietrich Hardt, both of Cologne; Volker Serini, Krefeld; Herbert Bartl, Odenthal-Hahnenberg; Hugo Vernaleken, Krefeld, all of Germany

[73] Assignee: Bayer Aktiengesellschaft, Germany

[22] Filed: Jan. 14, 1975

[21] Appl. No.: 540,981

[30] Foreign Application Priority Data

Jan. 17, 1974 Germany .......................... 2402177

[52] U.S. Cl. ............................ 260/4 AR; 260/827; 260/859 PV; 260/873

[51] Int. Cl.² ..................... C08L 7/00; C08L 67/06

[58] Field of Search ............... 260/4 AR, 859, 873, 260/827, 859 PV

[56] References Cited

UNITED STATES PATENTS 3,637,909   1/1972   Bonin ................................ 260/873

*Primary Examiner*—J. Ziegler
*Attorney, Agent, or Firm*—Connolly and Hutz

[57] ABSTRACT

Process for the production of vinyl chloride polymers modified with aromatic polycarbonate, characterized in that mixtures of olefinically unsaturated monomers containing at least 70 % by weight of vinyl chloride are polymerized by radical polymerization in the presence of aromatic polycarbonates, 0 – 100 % by weight of rubber or rubber-modified thermoplastic resin, based on the polycarbonate-modified vinyl chloride polymer, being added before or after polymerization.

14 Claims, No Drawings

POLYCARBONATE-POLYVINYL CHLORIDE MOULDING COMPOUNDS

This invention relates to thermoplastic moulding compounds with high dimensional stability to heat and high impact strength which are obtained by polymerisation of vinyl chloride and, optionally, other copolymerisable compounds in the presence of aromatic polycarbonates.

Polyvinyl chloride is widely used on account of its mechanical properties, chemical resistance and flame resistance. However, its freezing temperature (glass transition temperature) is about 80° C; its dimensional stability to heat (according to Vicat) is between 75° and 84° C, depending on the K-value (Fikentscher) and additives. It therefore fails to meet the requirements for many fields of application. Attempts have been made to improve the dimensional stability to heat by altering the molecular structure, by copolymerisation, by chemical after-treatment and by the addition of thermoplasts with a higher glass transition temperature (G. Kuhne et al., Kunststoffe Volume 63 (1973) pages 139 – 142). Improved products for practical use have been obtained, in particular, by rechlorination and cross-linking and by copolymerisation with maleic imides. A dimensional stability to heat (Vicat) of 90° C may be obtained in this way.

When attempts are made to obtain moulding compounds with increased dimensional stability to heat by mixing polyvinyl chloride with other thermoplasts, limits are set not only by the poor compatibility of polyvinyl chloride with many thermoplasts but also by the fact that the processing of the added thermoplasts required the use of temperatures which severely damage polyvinyl chloride or which at least lie at the upper limit of the range at which polyvinyl chloride may be worked-up so that disadvantageously high stabiliser concentrations are required.

This invention relates to a process for the production of vinyl chloride polymers which are modified with aromatic polycarbonate, characterised in that a mixture of olefinically unsaturated monomers containing at least 70%, by weight, of vinyl chloride, or preferably, pure vinyl chloride is polymerised by radical polymerisation in the presence of aromatic polycarbonates and 0 – 100%, by weight, of rubber or rubber-modified thermoplastic resin, based on the polycarbonate-modified vinyl chloride polymer, is added before or after polymerisation.

The polycarbonate-modified vinyl chloride polymers produced in this way constitute another object of this invention.

The polycarbonate-modified vinyl chloride polymers according to the invention are characterised by their high dimensional stability to heat, hardness, tensile strength and flexural strength, properties which are due to the high compatibility of the components. In addition, the moulding compounds are often transparent regardless of the content of polymerised vinyl chloride, for example if they contain polycarbonates based on 2,2-bis-(3,5-dimethyl-4-hydroxyphenyl)-propane or 2,4-bis-(3,5-dimethyl-4-hydroxyphenyl)-2-methyl butane. Furthermore, the polymers may be worked-up at unexpectedly low temperatures.

Thus, the products may be worked-up thermoplastically on heated rollers at temperatures far below the operating temperature required for the polycarbonates from which they are produced. If the moulding compounds contain a polycarbonate based on o,o,o',o'-tetramethyl-substituted bisphenols, they may be worked-up at 160° – 220° C, whereas the polycarbonate itself requires operating temperatures of 300° – 350° C. Such high operating temperatures would destroy polymers containing aliphatically-bound chlorine even if they are well stabilised.

Polyvinyl chloride modified with 50%, by weight, of polycarbonate based on 2,2-bis-(3,5-dimethyl-4hydroxyphenyl)-propane, for example, may achieve dimensional stabilities to heat (Vicat temperatures according to DIN 53 460 (5 kg) of 130° – 135° C.

It is advisable to add rubbers or rubber-modified resins if the products are expected to be subjected to impact stresses. The impact strength and notched impact strength of the moulding compounds without these additives are not equal to those of PVC. The addition of these rubbers or rubber-modified resins, on the other hand, results in moulding compounds with a high vinyl chloride content which are equal to impact-resistant and high impact-resistant PVC according to DIN 7748h in their toughness but considerably superior to them in their hardness, tensile strength, flexural strength and modulus of elasticity and in addition may be transparent.

The inflammability of the moulding compounds is much less than that of pure polycarbonates and is intermediate between that of the pure polycarbonate and that of the pure polyvinyl chloride, depending on the quantity of incorporated vinyl chloride.

The moulding compounds are also highly resistant to hydrolysis, e.g. to the action of acids or alkalis, and to numerous solvents.

Suitable aromatic polycarbonates may be homo- or co-polycarbonates or mixtures thereof. The polycarbonates generally have molecular weights of 10,000 – 200,000 (average molecular weight), preferably 20,000 – 80,000. They may be prepared for example, by the known diphasic interface process from phosgene and bisphenols by polycondensation (see German OS Nos. 2,063,050; 2,063,052; 1,570,703; 2,211,956; 2,211,957 and 2,248,817 and French PS No. 1,561,518; monograph "H. Schnell, Chemistry and Physics of Polycarbonates, Interscience Publishers, New York, 1964").

The aromatic polycarbonates may be based on the following bisphenols:
hydroquinone,
resorcinol,
dihydroxy diphenyls,
bis-(hydroxyphenyl)-alkanes,
bis-(hydroxyphenyl)-cycloalkanes,
bis-(hydroxyphenyl)-sulphides,
bis-(hydroxyphenyl)-ethers,
bis-(hydroxyphenyl)-ketones,
bis-(hydroxyphenyl)-sulphoxides,
bis-(hydroxyphenyl)-sulphones and
α,α'-bis-(hydroxyphenyl)-diisopropyl benzenes
as well as the corresponding compounds substituted in the nucleus. These and other suitable aromatic dihydroxy compounds have been described in US-PS Nos. 3,028,365; 2,999,835; 3,148,172; 3,271,368; 2,991,273; 3,271,367; 3,780,078; 3,014,891 and 2,999,846 and in German OS Nos. 1,570,703; 2,063,050 and 2,063,052 and in French PS No. 1,561,518.

Preferred aromatic polycarbonates are those in which 5 – 100 mols-% of the structural units correspond to formula (1):

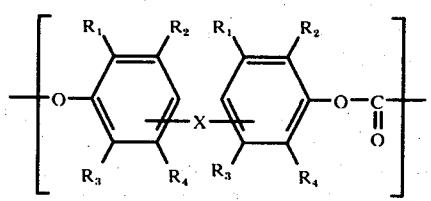

wherein $R_1$, $R_2$, $R_3$ and $R_4$ = $C_1 - C_3$ alkyl, Cl, Br, phenyl and H, but not more than 3 of the groups $R_1$, $R_2$, $R_3$ and $R_4$ may be H; X = a single bond, -O-, -CO-, -$SO_2$-$C_1$-$C_{10}$-alkylene, $C_1$-$C_{10}$-alkylidene, $C_5$-$C_{15}$-cycloalkylene, $C_5$-$C_{15}$-cycloalkylidene, $C_7$-$C_{20}$-cycloalkyl alkylene, $C_6$-$C_{20}$-cycloalkyl alkylidene or

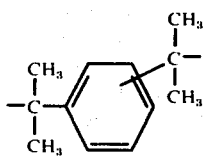

and/or formula (2)

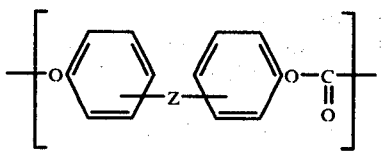

wherein Z = $C_5$-$C_{20}$-alkylene, $C_5$-$C_{20}$-alkylidene, $C_5$-$C_{15}$-cycloalkylene, $C_5$-$C_{15}$-cycloalkylidene, $C_7$-$C_{20}$-cycloalkyl alkylene or $C_6$-$C_{20}$-cycloalkyl alkylidene.

Aromatic polycarbonates containing 5 – 30 mols-% of structural units of formula (1) and/or (2) as well as those containing 50 – 100 mols-% of these structural units are particularly preferred.

Preferred structural units of formula (1) are those of formula (3):

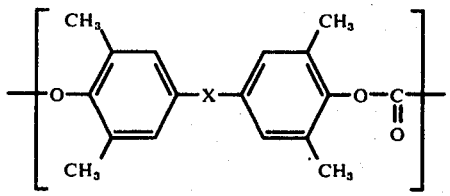

wherein X is as defined above.

The structural units of formula (3) may be based on the following bisphenols, for example:
bis-(3,5-dimethyl-4-hydroxyphenyl),
bis-(3,5-dimethyl-4-hydroxyphenyl)-ether,
bis-(3,5-dimethyl-4-hydroxyphenyl)-carbonyl,
bis-(3,5-dimethyl-4-hydroxyphenyl)-sulphone,
bis-(3,5-dimethyl-4-hydroxyphenyl)-methane,
1,1-bis-(3,5-dimethyl-4-hydroxyphenyl)-ethane,
1,1-bis-(3,5-dimethyl-4-hydroxyphenyl)-propane,
2,2-bis-(3,5-dimethyl-4-hydroxyphenyl)-butane,
2,4-bis-(3,5-dimethyl-4-hydroxyphenyl)-2-methyl butane,
2,4-bis-(3,5-dimethyl-4-hydroxyphenyl)-butane,
3,3-bis-(3,5-dimethyl-4-hydroxyphenyl)-pentane,
3,3-bis-(3,5-dimethyl-4-hydroxyphenyl)-hexane,
4,4-bis-(3,5-dimethyl-4-hydroxyphenyl)-heptane,
2,2-bis(3,5-dimethyl-4-hydroxyphenyl)-octane,
2,2-bis-(3,5-dimethyl-4-hydroxyphenyl)-nonane,
2,2-bis-(3,5-dimethyl-4-hydroxyphenyl)-decane,
1,1-bis-(3,5-dimethyl-4-hydroxyphenyl)-cyclohexane,
1,4-bis-(3,5-dimethyl-4-hydroxyphenyl)-cyclohexane,
α,α'-bis-(3,5-dimethyl-4-hydroxyphenyl)-p-diisopropyl benzene and
α,α'-bis-(3,5-dimethyl-4-hydroxyphenyl)-m-diisopropyl benzene.

Those structural units of formulae (1) and (2) which are based on the following bisphenols are particularly preferred:
bis-(3,5-dimethyl-4-hydroxyphenyl)-methane,
2,2-bis-(3,5-dimethyl-4-hydroxyphenyl)-propane
2,4-bis-(3,5-dimethyl-4-hydroxyphenyl)-2-methyl butane,
1,1-bis-(3,5-dimethyl-4-hydroxyphenyl)-cyclohexane,
α,α'-bis-(3,5-dimethyl-4-hydroxyphenyl)-p-diisopropyl benzene,
2,2-bis-(3,5-dichloro-4-hydroxyphenyl)-propane,
2,2-bis-(3,5-dibromo-4-hydroxyphenyl)-propane,
1,1-bis-(4-hydroxyphenyl)-cyclohexane,
α,α'-bis-(4-hydroxyphenyl)-m-diisopropyl benzene,
α,α'-bis-(4-hydroxyphenyl)-p-diisopropyl benzene,
2,4-bis-(4-hydroxyphenyl)-2-methyl butane,
2,2-bis-(3-methyl-4-hydroxyphenyl)-propane and
2,2-bis-(3-chloro-4-hydroxyphenyl)-propane.

In addition to containing structural units of formulae (1) and (2), the preferred polycarbonates preferably contain structural units of formula (4):

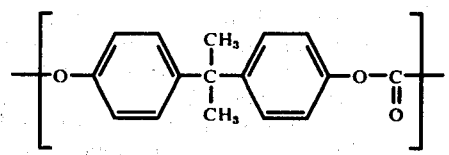

Polycarbonates based solely on the above-mentioned o,o,o',o'-tetramethyl-substituted bisphenols are particularly important, in particular, the homopolycarbonate based on 2,2-bis-(3,5-dimethyl-4-hydroxyphenyl)-propane.

The polycarbonates may also be branched by incorporating small quantities of polyhydroxyl compounds in them by condensation, e.g. 0.05 – 2.0 mol-% (based on the quantity of bisphenols used). Polycarbonates of this type have been described, for example, in German OS Nos. 1,570,533; 2,116,974 and 2,113,347, British PS Nos. 885,442 and 1,079,821 and US-PS No. 3,544,514. The following are some examples of polyhydroxyl compounds which may be used for this purpose: phloroglucinol; 4,6-dimethyl-2,4,6-tri-(4-hydroxyphenyl)-heptane-2; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane, 2,2-bis-[4,4-(4,4'-dihydroxydiphenyl)-cyclohexyl]-propane; 2,4-bis-(4- hydroxyphenyl-4-isopropyl)-phenol; 2,6-bis-(2'-hydroxy-5'-methyl-benzyl)-4-methyl-phenol; 2,4-dihydroxy-benzoic acid; 2-(4-hydroxyphenyl)-2-(2,4-dihydroxyphenyl)-propane and 1,4-bis-(4',4''-dihydroxytriphenylmethyl)-benzene.

Olefinically unsaturated monomers which may be used for the purpose of this invention apart from vinyl chloride include, for example, vinylidene chloride and vinylidene fluoride; vinyl esters, such as vinyl acetate, vinyl propionate, vinyl laurate or vinyl benzoate; acrylic acid, methacrylic acid, maleic acid and fumaric acid and their alkyl esters containing 1 – 10 C-atoms; amides and nitriles of acrylic acid and methacrylic acid; maleic acid anhydride and maleic acid imides; vinyl ethers or olefinically unsaturated hydrocarbons, such as ethylene, propylene or butene-(1).

Rubbers suitable for the purpose of this invention are in particular natural rubber and synthetic rubbers. The following synthetic rubbers, for example, may be used: polypentenamer, ethylene-propylene-diene rubber (diene, e.g. hexadiene-(1,5), norbornadiene or ethylidene norbornene), diene rubbers, i.e. homopolymers of conjugated dienes containing 4 – 8 carbon atoms, such as butadiene, isoprene, piperylene and chloroprene, copolymers of such dienes with each other and copolymers of such dienes with styrene or acrylic or methacrylic compounds (e.g. acrylonitrile, methacrylonitrile, acrylic acid, methacrylic acid, butyl acrylate and methyl methacrylate) or isobutylene. Butadiene, butadiene-styrene, butadiene-methyl methacrylate, butadiene-butyl acrylate, ethylene-propylene-diene, polypentenamer and butadiene-acrylonitrile rubbers are particularly preferred; these may still contain small proportions of other monomers condensed in them, for example, the last-mentioned rubber may contain divinyl benzene and methacrylic acid. Elastomeric polyurethanes, silicone rubbers, polyether rubbers and chlorinated low-pressure polyethylene with a chlorine content of 20 – 50% by weight, as well as copolymers of ethylene and vinyl acetate with a vinyl acetate content of 15 – 65% by weight, preferably 30 – 65%, by weight, are also suitable.

The following are rubber-modified thermoplastic resins suitable for the purpose of the invention:
A. graft polymers of vinyl compounds (a) on rubbers (b); or
B. mixtures of graft polymers (A) and thermoplastic resins (c) prepared by the polymerisation of vinyl compounds (a); or
C. mixtures of the rubbers (b) with thermoplastic resins (c).

The following are examples of suitable vinyl compounds (a):

a 1. styrene and its derivatives, such as α-methyl styrene, α-chlorostyrene, p-chlorostyrene, 2,4-dichlorostyrene, p-methyl styrene, 3,4-dimethyl styrene, o- and p-divinyl benzene, p-methyl-α-methyl styrene and p-chloro-α-methyl styrene.

a 2. Acrylic and methacrylic compounds, such as acrylic and methacrylic acid, acrylonitrile, methacrylonitrile, methyl methacrylate, ethyl acrylate, n- and isopropyl acrylate, n- and iso-butyl acrylate, 2-ethyl-hexyl acrylate methyl methacrylate, ethyl methacrylate, n- and iso-propyl methacrylate, n- and iso-butyl methacrylate, cyclohexyl methacrylate and isobornyl methacrylate.

a 3. Vinyl chloride or vinyl monomers which may be copolymerised with vinyl chloride.

The resins and graft polymers may be prepared by conventional methods of radical polymerisation, e.g. by solvent-free solution, solution/precipitation, suspension or emulsion polymerisation. The graft polymers and the rubbers and resins may be mixed by conventional methods, e.g. on rollers or kneaders or by mixing the appropriate latices and then working-up the products after mutual precipitation.

Preferred rubber-modified resins include the graft polymers of styrene, α-methyl styrene, acrylonitrile, methacrylic acid esters or mixtures thereof on a rubber, such as polybutadiene or a butadiene copolymer and mixtures of such graft polymers with polystyrene or styrene copolymers.

The preferred rubber-modified resins may in particular have the following composition:
I. Graft polymer consisting of:
(I 1) 5 – 90%, by weight, preferably 5 – 60%, by weight, of a rubbery elastic butadiene polymer or copolymer containing up to 50%, by weight, of copolymerised styrene, acrylonitrile and/or alkyl esters of acrylic acid or methacrylic acid containing 1 – 10 C-atoms in the alcohol group as graft basis; and
(I 2) 10 – 95% by weight, preferably 40 – 95%, by weight, of a monomer mixture of:
(I 2.1) 50 – 100 parts, by weight, of styrene, α-methyl styrene, $C_1 – C_{10}$ alkyl esters of acrylic and methacrylic acids or mixtures thereof:
(I 2.2) 0 – 50 parts, by weight, of acrylonitrile, methacrylonitrile, $C_1 – C_{10}$ alkyl esters of acrylic or methacrylic acid or mixtures thereof which are polymerised in the presence of (I 1).
II. Mixtures of:
(II 1) 5 – 80%, by weight, of polymer (I); and
(II 2) 20 – 95%, by weight, of a thermoplastic polymer or copolymer of the monomers (I 2).
III Mixtures of:
(III 1) 5 – 60%, by weight, of a rubber according to (I 1); and
(III 2) 40 – 95%, by weight, of a thermoplastic polymer according to (II 2).

To produce the moulding compounds according to the invention, the polycarbonate is introduced into vinyl chloride or into a mixture of vinyl chloride and other olefinically unsaturated monomers. Polycarbonates which are capable of swelling or dissolving in monomers are preferred, and, more particularly, those which are soluble. Polycarbonates of this type may be found in particular among polycarbonates which contain 5 – 100 mols-% of the structural units of formula (1) and/or (2). Polycarbonates which are not completely soluble, e.g. the most commonly known commercial polycarbonates based on 2,2-bis-(4-hydroxyphenyl)-propane, may also be used for producing the moulding compounds according to the invention, provided they are sufficiently finely divided. However, these polycarbonates are liable to give rise to partially heterogeneous moulding compounds which cannot be processed so satisfactorily. Soluble polycarbonates are therefore preferred.

The solution or suspension of polycarbonate in vinyl chloride is subjected to a radical, solvent-free, solution, emulsion or suspension polymerisation. Suspension polymerisation is preferred because the polymers then obtained in the form of fine powders may easily be worked-up.

Polymerisation is generally performed by the known methods for vinyl chloride polymerisation. Molecular weight regulators, buffer mixtures, multiply unsaturated monomers which serve to increase the molecular weight and dispersing agents may be added if desired. Suitable dispersing agents include, for example, alkylated celluloses either pure or in an etherified form, partially saponified polyvinyl acetate, gelatine, polyacrylic acid and styrene/maleic acid derivatives. They are preferably used in quantities of 0.1 to 1% by weight (based on water). The addition of surface-active substances (e.g. alkyl sulphonates) is sometimes required.

From 5 – 80 parts by weight, preferably 10 – 30 parts by weight, of polycarbonate are used for 95 – 20 parts, by weight, of vinyl chloride (or a mixture thereof with copolymerisable compounds) and polymerisation is continued to conversion rates of 50 – 98%. The dimensional stability of the moulding compounds to heat increases with increasing polycarbonate content.

For reasons of solubility it may be advisable to use an excess of vinyl chloride, in which case only part of it, e.g. half, is polymerised.

Products with a high polycarbonate content (above 50%, by weight) may be obtained in a particularly finely divided form by suspension polymerisation of the polycarbonate is suspended in vinyl chloride as a fine powder and left to swell at 20° – 80° C. The difficulty encountered with the usual stirring apparatus of achieving sufficiently fine sub-division of the highly viscous polycarbonate/vinyl chloride solution is thereby obviated.

Any of the conventional catalysts used for suspension or solvent-free polymerisation, such as peroxides, percarbonates, hydroperoxides, peresters, azo compounds, may be used as well as boroalkyl compounds and boroalkyl hydroxyl compounds, optionally together with oxygen, as may also radical-forming agents which contain hetero atoms, such as acetyl cyclohexane sulphonyl peroxide. The choice and quantity depends on the polymerisation temperature, the desired molecular weight and the desired or possible polymerisation velocity.

Polymerisation may generally be carried out at temperatures of −10° C. to 100° C, preferably 25° – 70° C. If the temperature at which the polycarbonate dissolves is not substantially below the polymerisation temperature, the catalysts are added only shortly before the onset of polymerisation. In other cases, they may be added when the polycarbonate dissolves.

When the desired degree of conversion has been reached, the polymers are isolated in known manner. They are obtained as homogeneous, fine-grained powders with particle diameters of 10 – 500 $\mu$m (preferably 50 – 200 $\mu$m). They are generally soluble in dimethylformamide and partially also in cyclohexanone.

The K-values according to Fikentscher of the moulding compounds according to the invention are substantially equal to those of a polyvinyl chloride which has been prepared under otherwise identical conditions. This does not mean that their molecular weights are the same. On the contrary, there are indications that the different polymer chains influence each other. Fractionation experiments carried out with solvent mixtures suggest that a substantial proportion (approximately 50%, by weight) of the polyvinyl chloride is grafted on the polycarbonate.

Before the moulding compounds according to the invention are worked-up thermoplastically, the finely dispersed to pulverulent products may be intimately mixed with a polyvinyl chloride stabiliser, lubricants and optionally other additives, such as fillers or pigments, for 5 minutes in a high-speed mixer at 1000 – 2000 revs. per min., and during this time the temperature in the mixer may rise to about 150° C. After cooling to about 40° C, the mixture which is now ready for working-up may be processed thermoplastically into semi-finished or finished products by the conventional plastics processing methods. Homogenising rollers followed by calender rollers, injection moulding machines and extruders, as well as blow moulds, are suitable for this purpose. Temperatures of 160° – 220° C are required for the thermoplastic process.

If desired, the ready-for-use mixture may first be converted into a granulate which may then be processed into semi-finished or finished articles by the conventional thermoplastic methods.

The rubbers and rubber-modified resins are in most cases in the form of powder or lumps. They may simply be mixed with the polymers without any special measures or they may be added before polymerisation.

The addition of such rubber-modified resins normally destroys the transparency of a moulding compound. In the moulding compounds according to this invention, however, the transparency is preserved if transparent graft polymers of the type defined under (I) which have practically the same refractive index as the transparent moulding compounds are added as rubber-modified resin.

The rubber generally forms a separate phase which is finely divided in the polycarbonate-modified polyvinyl chloride polymers of this invention.

The rubber may be in the form of individual pellets or agglomerates of several pellets or other regular or irregular particles or agglomerates of particles or in the form of a network of particles in which another polymer is embedded. The particles generally measure 0.01 – 20 $\mu$m, preferably 0.03 – 10 $\mu$m. The particles may be of one or several types, depending on the method of preparation of the polymers and choice of individual components, and the individual types of particles may differ greatly from each other in their form, size and size distribution. Polymers having the same rubber content and also otherwise the same composition may differ in their properties due to differing rubber phases, e.g. the polymers may differ in their toughness and surface gloss.

The moulding compounds according to the invention may be stabilised with the conventional polyvinyl chloride stabilisers based on lead, barium/cadmium or calcium/zinc or organic tin compounds or organic PVC stabilisers used either singly or in combination. The lubricants are also selected from the point of view of the requirements of PVC processing. Since at high polycarbonate contents the processing temperatures of the moulding compounds may lie at the upper tolerance limit for polyvinyl chloride, efficient stabilisation is particularly important. It may be necessary to use higher quantities of stabiliser than is customary for polyvinyl chloride.

Colour pigments, fillers, glass fibres, antistatic agents, flame-retarding agents and plasticisers may also be added. Physical or chemical blowing agents may also be used to obtain a foam structure.

The moulding compounds according to the invention may be used, for example, for manufacturing plates, sections and tubes, in particular for the building industry where high heat distortion temperatures are particularly important. They may also be used for the manufacture of bottles, containers and foils which come into contact with hot contents. The high resistance of the moulding compounds to hydrolysis makes them suitable for use in chemical apparatus, the construction of storage containers for acids and alkalis and ventilating systems for corrosive waste gases.

EXAMPLE 1

150 g of a polycarbonate granulate based on 2,2-bis-(3,5-dimethyl-4-hydroxyphenyl)-propane (average molecular weight = 45,000), 1.5 g of azodiisobutyronitrile and 3,000 g of distilled water in which 15 g of tylose (methyl cellulose) and 6 g of $K_2HPO_4$ are dissolved were introduced into a 6-litre corrosion-resistant steel autoclave equipped with stirrer and stuffing box. 1,500 g of vinyl chloride were introduced after removal of the oxygen by flushing with nitrogen. The temperature was then raised to 35° C and the autoclave contents were stirred for 3 hours at 400 revs. per min. to dissolve the polycarbonate. The temperature was thereafter raised to 60° C. When 83% of the vinyl chloride had been polymerised, the autoclave was cooled and the pressure released. The polymer obtained was vigorously washed with water and dried in a vacuum drying cupboard at 50° C. 1,390 g of a fine-grained polymer with a K-value of 56 (0.5% in dimethylformamide at 25° C) were obtained.

EXAMPLE 2

The same autoclave was charged with 280 g of the polycarbonate granulate described above, 1.2 g of azodiisobutyronitrile and 3,500 g of distilled water containing 16 g of methyl cellulose and 6 g of $K_2HPO_4$. The autoclave was evacuated and 800 g of vinyl chloride were forced in under pressure. After leaving the autoclave contents to dissolve for 6 hours, the temperature was raised to 60° C and maintained at that level for 3 hours. Working-up the reaction product yielded 1,030 g of a powder with an average particle size of 150 μm and a K-value of 53.

EXAMPLE 3

525 g of the polycarbonate mentioned above which had been obtained as a porous powder with a particle size of 300/μm by spray-drying a solution in methylene chloride, 1.2 g of lauroyl peroxide and 3,300 g of distilled water containing 15 g of methyl cellulose and 2.5 g of sodium acetate were used in the same way. 750 g of vinyl chloride were forced in. The reaction mixture was then stirred for 3 hours at 35° C and the temperature was then raised to 55° C. When 51% of the vinyl chloride had been polymerised, the reaction mixture was worked-up and 910 g of a fine-grained polymer with a K-value of 52 were obtained.

EXAMPLE 4

100 parts, by weight, of a polymer consisting of 89.2 parts, by weight, of polymerised vinyl chloride and 10.8 parts, by weight, of a polycarbonate based on 2,2-bis-(3,5-dimethyl-4-hydroxyphenyl)-propane (Example 1) are intimately mixed in a high-speed mixer for 1 minute at 1500 revs. per min. with the addition of a PVC stabiliser of 2 parts, by weight, or Irgastab 17 MOK (di-n-octyl-tin-dithioglycolic acid ester), 0.3 parts, by weight, of OP-wax (montanic acid ester) and 0.2 parts, by weight, of Hochst wax PA 520 (polyethylene wax). The mixture heats up during this mixing process. The mixture is then cooled to about 40° C with slow stirring. The resulting pulverulent mixture is applied to a rolling mill heated to 220° C on which it is homogenised for 5 minute. A transparent sheet is obtained which is put into a high pressure press where it is first preheated to 210° C for 3 minutes without pressure and then compressed to a plate for a further 3 minutes under pressure and the plate is made up into test samples. The mechanical properties of the transparent plates are shown in Table 1.

EXAMPLE 5

The procedure is the same as described in Example 4, but using a polymer consisting of 72.8 parts, by weight, of polymerised PVC and 27.2 parts, by weight, of the polycarbonate described in Example 1 (obtained according to Example 2).

EXAMPLE 6

The procedure is the same as described in Example 4, but using a polymer consisting of 42.4 parts, by weight, of polymerised vinyl chloride and 57.6 parts, by weight, of the polycarbonate described in Example 1 (method of preparation in Example 3).

EXAMPLE 7

Employing the procedure described in Example 4, 85 parts, by weight, of a polymer composed of polymerised PVC and a polycarbonate described in Example 1 in proportions of 10 : 7 are mixed with 15 parts, by weight, of an MBS polymer consisting of 30 parts, by weight of polybutadiene, 45 parts, by weight, of polymerised styrene and 25 parts, by weight, of polymerised methyl methacrylate. When the pulverulent mixture has been worked-up in a rolling mill as described in Example 4, the sheet obtained is compressed to form plates. The mechanical properties of the transparent polymer mixtures are shown in Table 1.

Table 1

| | Ball hardness DIN 53456 kp/cm 30" | Impact strength DIN 53453 cmkp/cm² R.T. | Impact strength DIN 53453 cmkp/cm² −20° C | Notched impact strength DIN 53453 cmkp/cm² R.T. | Notched impact strength DIN 53453 cmkp/cm² ±0° C | Dimensional stability to heat Vicat DIN 53460 ° C | Bending stress DIN 53452 δbf kp/cm² | Bending stress DIN 53452 $f_B$ mm | Tensile strength DIN 53455 δB kp/cm² | Elongation DIN 53455 εB % | E-modulus DIN 53457 bending/ traction kp/cm² |
|---|---|---|---|---|---|---|---|---|---|---|---|
| Ex. 4 | 1242 | 45 | — | 2 | — | 83 | 960 | 4.2 | 690 | 3.5 | 32000 |
| Ex. 5 | 1394 | 32 | — | 2 | — | 96 | 1130 | 3.0 | 715 | 4.2 | 31800 |
| Ex. 6 | 1529 | 68 | 29 | 2 | — | 135 | 1210 | 6.0 | 730 | 4.8 | 31200 |
| Ex. 7 | 1263 | x | 8/10 | 19 | 4 | 128 | 1005 | 5.3 | 615 | 4.8 | 26000 | x = not broken $n_{10} = \frac{\text{number of broken samples}}{\text{number of test samples}}$

We claim:

1. A process for the production of an aromatic polycarbonate-modified vinyl chloride polymer which comprises the radical polymerisation of a mixture of olefinically unsaturated monomers containing at least 70% by weight of vinyl chloride in the presence of at least one aromatic polycarbonate having an average molecular weight of from 10,000 to 200,000 and the addition of from 0-100% by weight, based on the aromatic polycarbonate-modified vinyl chloride polymer, of a rubber or a rubber-modified thermoplastic resin after polymerisation.

2. A process as claimed claim 1 in which the polycarbonate is soluble in or is capable of swelling in the monomer mixture.

3. A process as claimed in claim 1 in which from 5 to 80 parts by weight of polycarbonate are dissolved in from 95 to 20 parts by weight of the monomer mixture and are subsequently polymerised in the presence of a radical-forming agent.

4. A process as claimed in claim 1 in which from 50 to 98% of the monomer mixture is polymerised.

5. A process as claimed in claim 1 in which the polymerisation is carried out by suspension polymerisation.

6. A process as claimed in claim 1 in which from 5 to 100 mols-% of the structural units of the aromatic polycarbonate correspond to at least one formula selected from the group consisting of

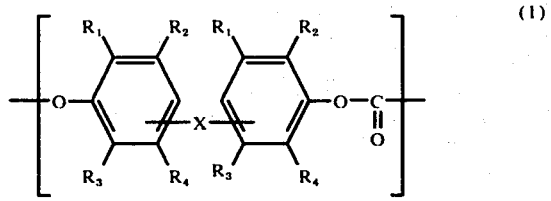

wherein $R_1$, $R_2$, $R_3$ and $R_4$, which may be the same or different, each represent $C_1$-$C_3$ alkyl, -Cl, -Br, phenyl or -H, but not more than 3 of the groups $R_1$, $R_2$, $R_3$ and $R_4$ may represent -H; X represents a single bond or -O-, -CO-, -$SO_2$-, $C_1$-$C_{10}$ alkylene, $C_1$-$C_{10}$ alkylidene, $C_5$-$C_{15}$ cycloalkylene, $C_5$-$C_{15}$ cycloalkylidene, $C_7$-$C_{20}$ cycloalkyl alkylene, $C_6$-$C_{20}$ cycloalkyl alkylidene or a group of the formula:

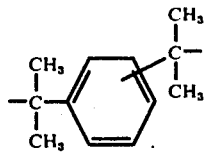

and

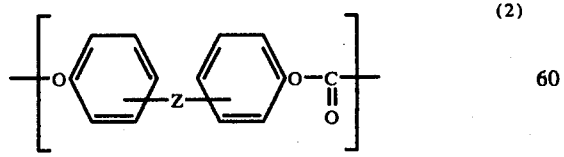

wherein Z represents a $C_5$-$C_{10}$ alkylene, $C_5$-$C_{20}$ alkylidene, $C_5$-$C_{15}$ cycloalkylene, $C_5$-$C_{15}$ cycloalkylidene, $C_7$-$C_{20}$ cycloalkyl alkylene or $C_6$-$C_{20}$ cycloalkyl alkylidene group.

7. A process as claimed in claim 6 in which from 5 to 30 mols-% of the structural units of the polycarbonate correspond to at least one formula selected from the group consisting of (1) and (2).

8. A process as claimed in claim 6 in which from 50 to 100 mols-% of the structural units of the polycarbonate correspond to at least one formula selected from the group consisting of (1) and (2).

9. A process as claimed in claim 6 in which the polycarbonate only contains structural units corresponding to the formula:

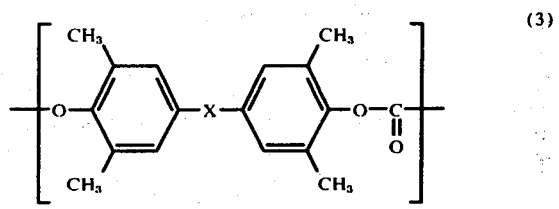

wherein X is as defined in claim 6.

10. A process as claimed in claim 9 in which the structural units corresponding to formula (3) are based on bis-(3,5-dimethyl-4-hydroxyphenyl)-methane, 2,2-bis-(3,5-dimethyl-4-hydroxyphenyl)-propane, 2,4-bis-(3,5-dimethyl-4-hydroxyphenyl)-2-methyl butane, 1,1-bis-(3,5-dimethyl-4-hydroxyphenyl)-cyclohexane or α,α'-bis-(3,5-dimethyl-4-hydroxyphenyl)-p-diisopropyl benzene.

11. A process as claimed in claim 6 in which the structural units corresponding to formula (1) are based on
bis-(3,5-dimethyl-4-hydroxyphenyl)-methane.
2,2-bis-(3,5-dimethyl-4-hydroxyphenyl)-propane,
2,4-bis-3,5-dimethyl-4-hydroxyphenyl)-2-methyl butane,
1,1-bis-(3,5-dimethyl-4-hydroxyphenyl)-cyclohexane, α,α'-bis-(3,5-dimethyl-4-hydroxyphenyl)-p-diisopropyl benzene,
2,2-bis-(3,5-dichloro-4-hydroxyphenyl)-propane,
2,2-bis-(3,5-dibromo-4-hydroxyphenyl)-propane,
1,1-bis-(4-hydroxyphenyl)-cyclohexane,
α,α'-bis-(4-hydroxyphenyl)-m-diisopropylbenzene,
α,α'-bis-(4-hydroxyphenyl)-p-diisopropyl benzene,
2,4-bis-(4-hydroxyphenyl)-2-methyl-butane,
2,2-bis-(3-methyl-4-hydroxyphenyl)-propane or
2,2-bis-(3-chloro-4-hydroxyphenyl)-propane.

12. A process as claimed in claim 6 in which, in addition to structural units corresponding to at least one formula selected from the group consisting of (1) and (2) the polycarbonate only contains structural units corresponding to the formula:

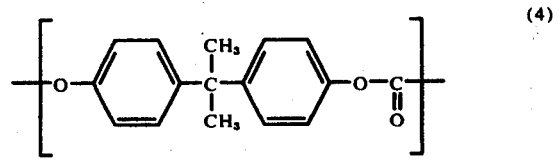

13. A process as claimed in claim 6 in which the polycarbonate consists entirely of structural units corresponding to the formula:

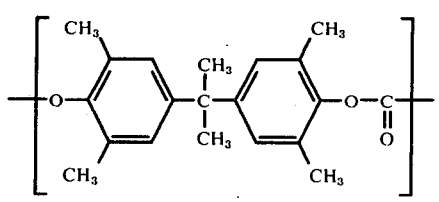
(5)
14. Aromatic polycarbonate-modified vinyl chloride polymers produced by the process of claim 1.
* * * * *

Dedication

4,005,037.—*Fritz Mietzsch; Dietrich Hardt,* both of Cologne; *Volker Serini,* Krefeld; *Herbert Bartl,* Odenthal-Hahnenberg; *HugoVernaleken,* Krefeld, all of Germany. POLYCARBONATE-POLYVINYL CHLORIDE MOULDING COMPOUNDS. Patent dated Jan. 25, 1977. Dedication filed Aug. 27, 1984, by the assignee, *Bayer Aktiengesellschaft.*

Hereby dedicates to the public the entire term of said patent.
[*Official Gazette October 23, 1984.*]